United States Patent
Watanabe

(10) Patent No.: US 12,498,446 B2
(45) Date of Patent: Dec. 16, 2025

(54) POSITIONING SYSTEM, POSITIONING METHOD, AND COMPUTER READABLE MEDIUM

(71) Applicant: Mitsubishi Electric Corporation, Tokyo (JP)

(72) Inventor: Futa Watanabe, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 391 days.

(21) Appl. No.: 18/158,351

(22) Filed: Jan. 23, 2023

(65) Prior Publication Data
US 2023/0160994 A1    May 25, 2023

Related U.S. Application Data

(63) Continuation of application No. PCT/JP2020/034582, filed on Sep. 11, 2020.

(51) Int. Cl.
| | |
|---|---|
| G01S 5/04 | (2006.01) |
| G01S 5/02 | (2010.01) |
| G01S 19/55 | (2010.01) |

(52) U.S. Cl.
CPC ........ G01S 5/0284 (2013.01); G01S 5/02955 (2020.05); G01S 19/55 (2013.01)

(58) Field of Classification Search
CPC .... G01S 5/0284; G01S 5/02955; G01S 19/55; G01S 5/021; G01S 5/04; G01S 5/08
See application file for complete search history.

(56) References Cited

U.S. PATENT DOCUMENTS

| | | |
|---|---|---|
| 2010/0248637 A1 | 9/2010 | Sahinoglu et al. |
| 2015/0247914 A1* | 9/2015 | Rothacher ............. G08G 5/727 |
| | | 701/300 |

(Continued)

FOREIGN PATENT DOCUMENTS

| | | |
|---|---|---|
| CN | 108919322 A | 11/2018 |
| GB | 2565106 A | 2/2019 |

(Continued)

OTHER PUBLICATIONS

Great Britain Office Action for Great Britain Application No. GB2302380.7, dated Apr. 5, 2023.

(Continued)

*Primary Examiner* — Kenneth T Lam
(74) *Attorney, Agent, or Firm* — Birch, Stewart, Kolasch & Birch, LLP

(57) ABSTRACT

A relative angle acquisition unit (110) acquires a relative angle (31) between each base station of a plurality of base stations and a communication device. A provisional position calculation unit (120) calculates a position of the communication device as a provisional position (32), using the relative angle (31) and a position of each base station. A weight calculation unit (130) calculates a distance between each base station and the communication device, using the position of each base station and the provisional position, and calculates a weighting coefficient (33) for correcting the provisional position (32) for each base station, based on the distance between each base station and the communication device. A device position calculation unit (140) calculates the position of the communication device as a device position (34), using the relative angle (31), the position of each base station, and the weighting coefficient (33).

8 Claims, 10 Drawing Sheets

(56) References Cited

U.S. PATENT DOCUMENTS

| | | | | |
|---|---|---|---|---|
| 2017/0307747 | A1* | 10/2017 | Pan | G01S 13/46 |
| 2018/0267137 | A1* | 9/2018 | Igura | G01S 5/0289 |
| 2019/0200181 | A1 | 6/2019 | Abou-Rizk et al. | |
| 2021/0356553 | A1* | 11/2021 | Wolf | G01S 5/06 |
| 2023/0147535 | A1* | 5/2023 | Terazawa | G01C 21/30 |

FOREIGN PATENT DOCUMENTS

| | | | |
|---|---|---|---|
| JP | 2000-244967 | A | 9/2000 |
| JP | 2001-305210 | A | 10/2001 |
| JP | 2008-139292 | A | 6/2008 |
| JP | 2009-236781 | A | 10/2009 |
| JP | 2009-239562 | A | 10/2009 |
| JP | 2012-517583 | A | 8/2012 |
| WO | WO 2017/079839 | A1 | 5/2017 |

OTHER PUBLICATIONS

International Search Report for PCT/JP2020/034582 (PCT/ISA/210) mailed on Nov. 2, 2020.
Tomic et al., "On Target Localization Using Combined RSS and AoA Measurements", Sensors, vol. 18, Issue. 4, pp. 1-25, 2018.
Singapore Office Action and Written Opinion for Singapore Application No. 11202300031U, dated Jul. 15, 2025.

* cited by examiner

Fig. 6

151: BASE STATION INFORMATION

| IDENTIFIER | POSITION OF BASE STATION |
|---|---|
| ID001 | [$x_1, y_1, z_1$] |
| ID002 | [$x_2, y_2, z_2$] |
| ... | ... |

Fig. 8

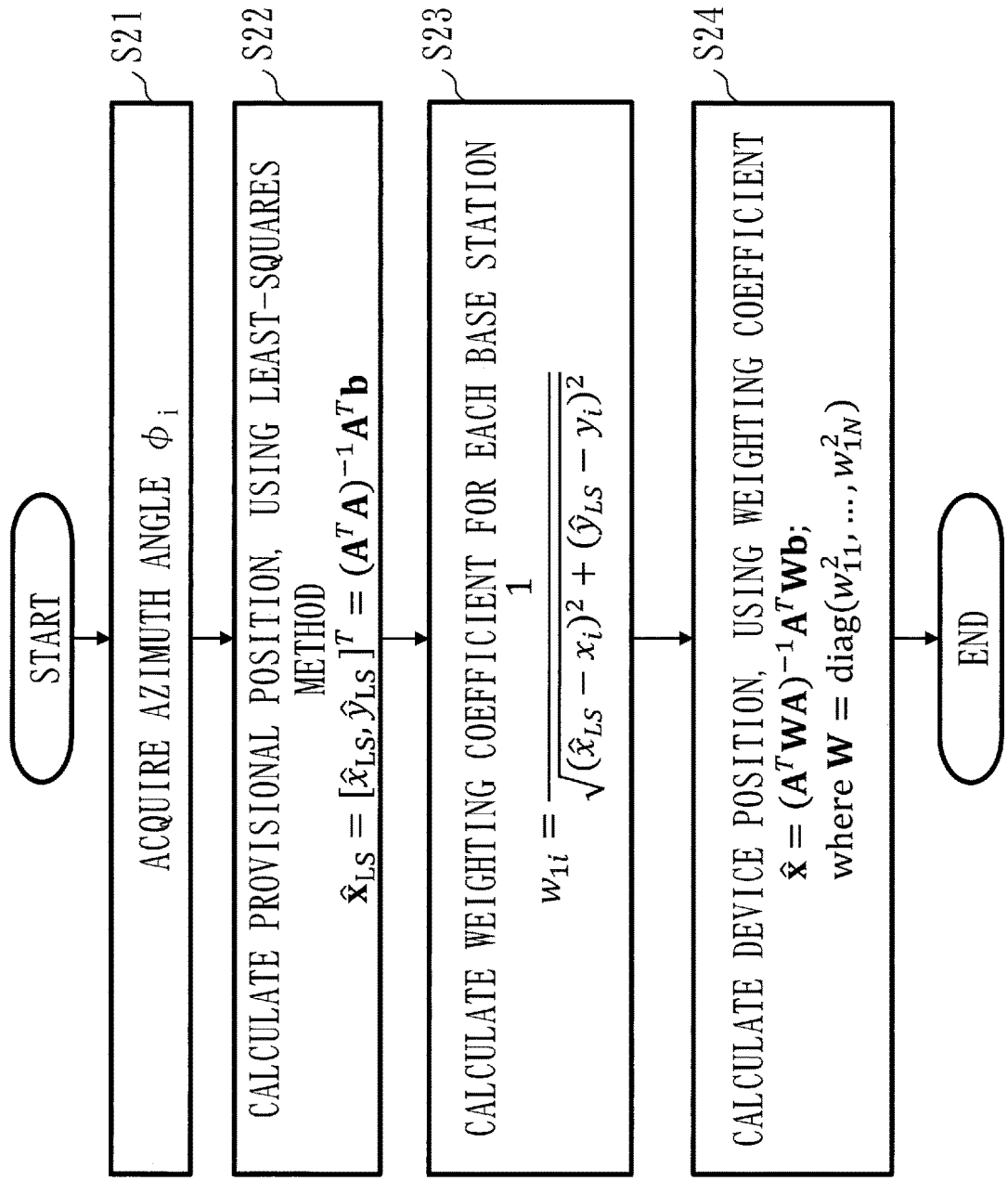

START → S21 ACQUIRE AZIMUTH ANGLE $\phi_i$ → S22 CALCULATE PROVISIONAL POSITION, USING LEAST-SQUARES METHOD $\hat{x}_{LS} = [\hat{x}_{LS}, \hat{y}_{LS}]^T = (A^T A)^{-1} A^T \mathbf{b}$ → S23 CALCULATE WEIGHTING COEFFICIENT FOR EACH BASE STATION $w_{1i} = \dfrac{1}{\sqrt{(\hat{x}_{LS} - x_i)^2 + (\hat{y}_{LS} - y_i)^2}}$ → S24 CALCULATE DEVICE POSITION, USING WEIGHTING COEFFICIENT $\hat{\mathbf{x}} = (A^T W A)^{-1} A^T W \mathbf{b}$; where $\mathbf{W} = \mathrm{diag}(w_{11}^2, \ldots, w_{1N}^2)$ → END

POSITIONING SYSTEM, POSITIONING METHOD, AND COMPUTER READABLE MEDIUM

CROSS REFERENCE TO RELATED APPLICATION

This application is a Continuation of PCT International Application No. PCT/JP2020/034582, filed on Sep. 11, 2020, which is hereby expressly incorporated by reference into the present application.

TECHNICAL FIELD

The present disclosure relates to a positioning system, a positioning method, and a positioning program.

BACKGROUND ART

In areas such as offices, factories, and commercial facilities, position information of people and things is attracting attention. In order to acquire position information, various positioning techniques are being considered Non-Patent Literature 1 proposes a positioning technique that combines angle information and radio wave intensity.

CITATION LIST

Non-Patent Literature

Non-Patent Literature 1: S. Tomic, M. Beko, R. Dinis and L. Bernardo, "On Target Localization Using Combined RSS and AoA Measurements," Sensors, Vol. 18, Issue. 4, pp. 1-25, 2018

SUMMARY OF INVENTION

Technical Problem

In the positioning technique described in Non-Patent Literature 1, positioning accuracy is improved by a weighted least-squares method using weights based on radio wave intensity. Therefore, a problem is that positioning accuracy cannot be improved in an environment where radio wave intensity cannot be obtained or radio wave intensity fluctuates greatly.

An object of the present disclosure is to realize highly accurate positioning using only angle information.

Solution to Problem

A positioning system according to the present disclosure performs positioning of a communication device that wirelessly communicates with each base station of a plurality of base stations, and the positioning system includes a relative angle acquisition unit to acquire a relative angle between each base station of the plurality of base stations and the communication device from each base station of the plurality of base stations;

a provisional position calculation unit to calculate a position of the communication device as a provisional position, using the relative angle between each base station of the plurality of base stations and the communication device and a position of each base station of the plurality of base stations;

a weight calculation unit to calculate a distance between each base station of the plurality of base stations and the communication device, using the position of each base station of the plurality of base stations and the provisional position, and calculate a weighting coefficient for correcting the provisional position for each base station of the plurality of base stations, based on the distance between each base station of the plurality of base stations and the communication device; and a device position calculation unit to calculate the position of the communication device as a device position, using the relative angle between each base station of the plurality of base stations and the communication device, the position of each base station of the plurality of base stations, and the weighting coefficient for each base station of the plurality of base stations.

Advantageous Effects of Invention

A positioning system according to the present disclosure calculates the position of a communication device as a device position, using a relative angle between each base station and the communication device and a weighting coefficient obtained based on the distance between each base station and the communication device. Therefore, the positioning system according to the present disclosure can realize highly accurate positioning using only angle information.

BRIEF DESCRIPTION OF DRAWINGS

FIG. 6 is a diagram illustrating an example of base station information according to Embodiment 1;

FIG. 8 is a flowchart illustrating a positioning process using two-dimensional positioning by the positioning system according to Variation 1 of Embodiment 1;

DESCRIPTION OF EMBODIMENTS

Figure 1:
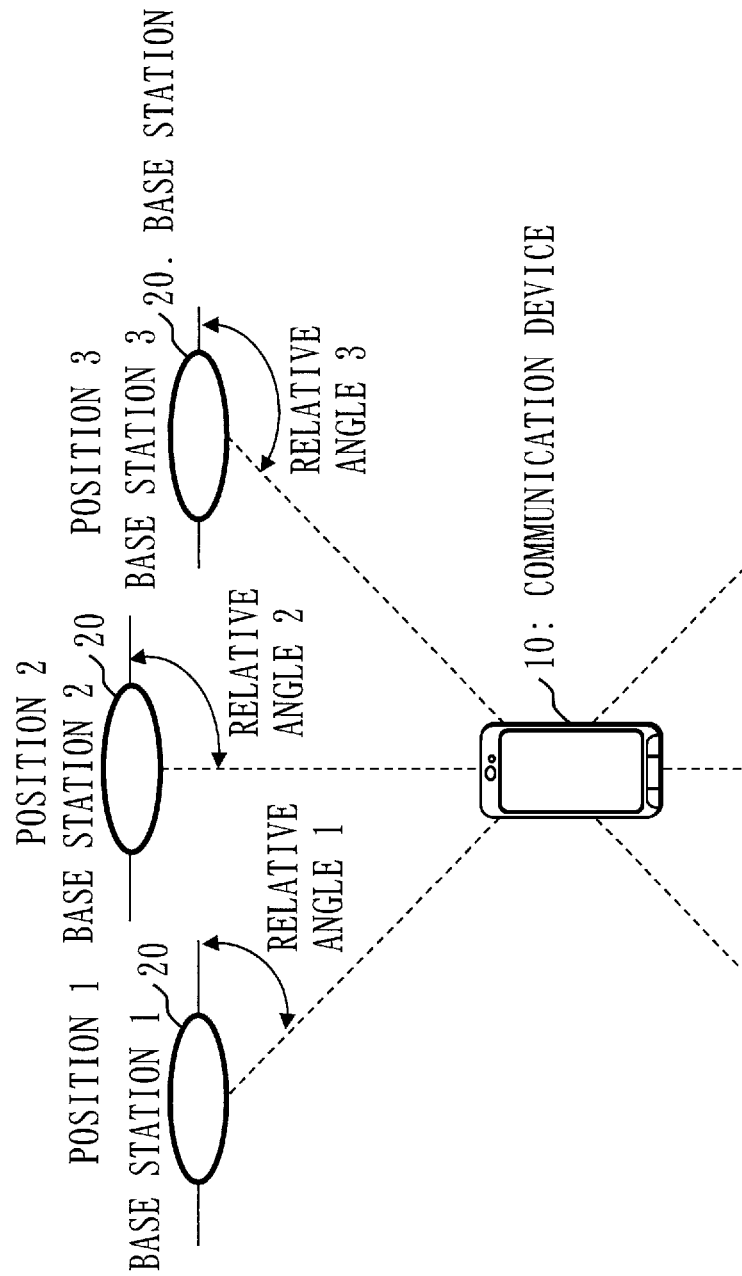
FIG. 1 is a diagram illustrating a communication device that is a positioning target and base stations according to Embodiment 1.

An embodiment of the present disclosure will be described hereinafter with reference to the drawings. Throughout the drawings, the same or corresponding parts are denoted by the same reference signs. In the description of the embodiment, description of the same or corresponding parts will be suitably omitted or simplified. In the drawings hereinafter, the relative sizes of components may be different from actual ones. In the description of the embodiment, directions or positions such as "up", "down", "left", "right", "front", "rear", "top side", and "back side"

may be indicated. These terms are used only for convenience of description, and are not intended to limit the placement and orientation of components such as devices, equipment, or parts.

Embodiment 1

* Description of Configurations *

FIG. 1 is a diagram illustrating a communication device 10 that is a positioning target and base stations 20 according to this embodiment.

In this embodiment, a positioning system 100 that performs positioning of the communication device 10 that wirelessly communicates with each base station 20 of a plurality of base stations will be described. The communication device 10 is the positioning target and is referred to also as a positioning target terminal.

It is assumed that there are M communication devices 10. It is assumed that there are N base stations. M and N are natural numbers. FIG. 1 illustrates a case where there are one communication device 10 and three base stations 20.

The communication device 10 wirelessly communicates with each base station 20 of the plurality of base stations. Specifically, the communication device 10 is a terminal that communicates with the base station 20 by wireless communication, such as a smartphone terminal, a tablet terminal, or a smartwatch.

The base station 20 can calculate a relative angle 31 with the communication device 10 or another base station. In FIG. 1, a base station 1 calculates a relative angle 1 with the communication device 10, a base station 2 calculates a relative angle 2 with the communication device 10, and a base station 3 calculates a relative angle 3 with the communication device 10.

Figure 2:
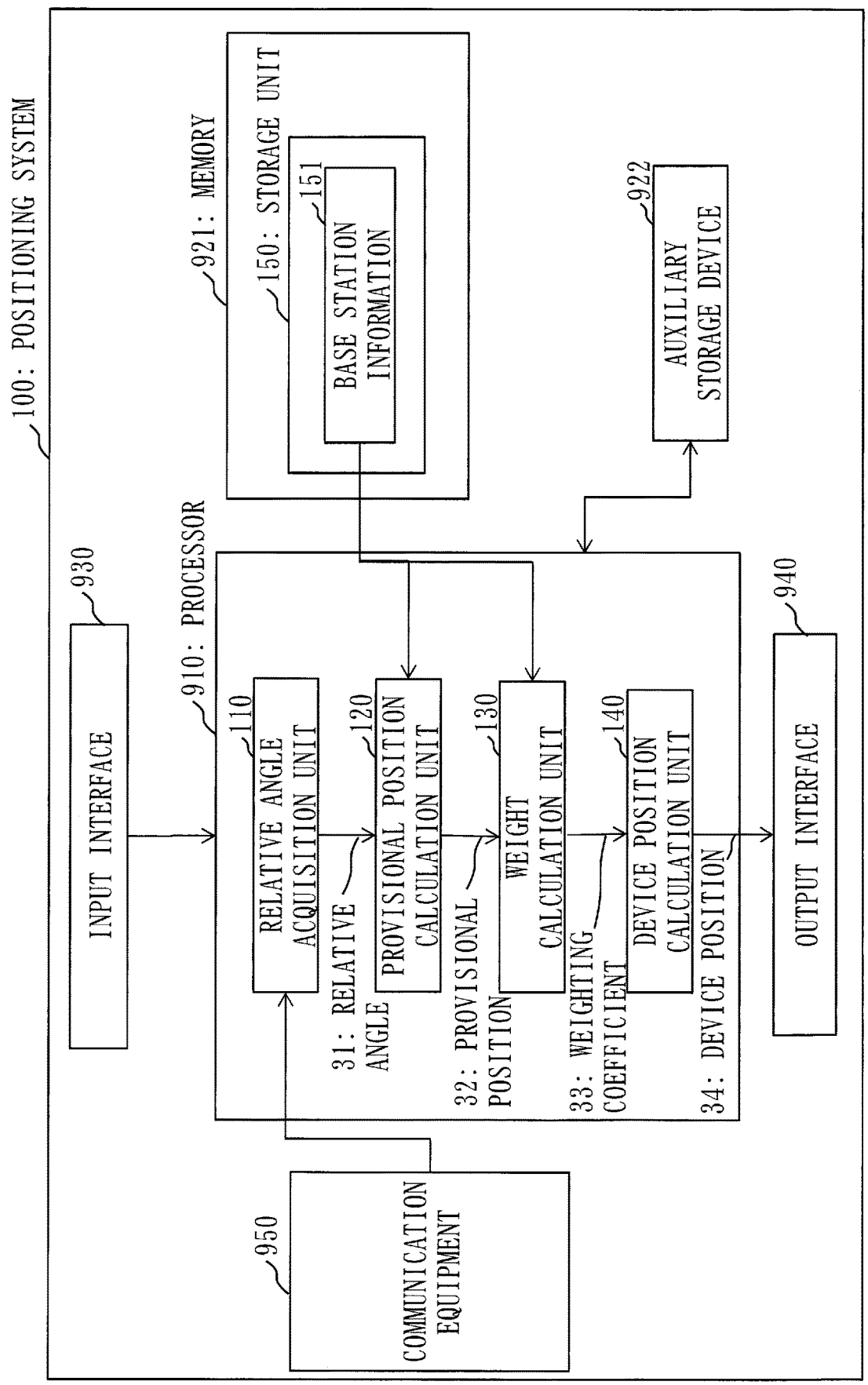
FIG. 2 is an example of a configuration of a positioning system according to Embodiment 1.

Referring to FIG. 2, an example of a configuration of the positioning system 100 according to this embodiment will be described.

The positioning system 100 is a computer. The positioning system 100 includes a processor 910, and also includes other hardware such as a memory 921, an auxiliary storage device 922, an input interface 930, an output interface 940, and communication equipment 950. The processor 910 is connected with other hardware components via signal lines and controls these other hardware components.

The positioning system 100 may be installed in the communication device 10 or may be installed in the base station 20. Alternatively, the communication device 10 may be installed in a computer other than the base station 20.

The positioning system 100 includes, as functional elements, a relative angle acquisition unit 110, a provisional position calculation unit 120, a weight calculation unit 130, a device position calculation unit 140, and a storage unit 150. In the storage unit 150, base station information 151 is stored.

The functions of the relative angle acquisition unit 110, the provisional position calculation unit 120, the weight calculation unit 130, and the device position calculation unit 140 are realized by software. The storage unit 150 is provided in the memory 921. The storage unit 150 may be provided in the auxiliary storage device 922, or may be divided and provided in the memory 921 and the auxiliary storage device 922.

The processor 910 is a device that executes a positioning program. The positioning program is a program that realizes the functions of the relative angle acquisition unit 110, the provisional position calculation unit 120, the weight calculation unit 130, and the device position calculation unit 140.

The processor 910 is an integrated circuit (IC) that performs operational processing. Specific examples of the processor 910 is a central processing unit (CPU), a digital signal processor (DSP), and a graphics processing unit (GPU).

The memory 921 is a storage device to temporarily store data. Specific examples of the memory 921 are a static random access memory (SRAM) and a dynamic random access memory (DRAM).

The auxiliary storage device 922 is a storage device to store data. A specific example of the auxiliary storage device 922 is an HDD. Alternatively, the auxiliary storage device 922 may be a portable storage medium, such as an SD (registered trademark) memory card, CF, a NAND flash, a flexible disk, an optical disc, a compact disc, a Blu-ray (registered trademark), or a DVD. HDD is an abbreviation for Hard Disk Drive. SD (registered trademark) is an abbreviation for Secure Digital. CF is an abbreviation for CompactFlash (registered trademark). DVD is an abbreviation for Digital Versatile Disk.

The input interface 930 is a port to be connected with an input device such as a mouse, a keyboard, or a touch panel. Specifically, the input interface 930 is a Universal Serial Bus (USB) terminal. The input interface 930 may be a port to be connected with a local area network (LAN).

The output interface 940 is a port to which a cable of an output device such a display is to be connected. Specifically, the output interface 940 is a USB terminal or a High Definition Multimedia Interface (HDMI) (registered trademark) terminal. Specifically, the display is a liquid crystal display (LCD). The output interface 940 is referred to also as a display interface.

The communication equipment 950 has a receiver and a transmitter. The communication equipment 950 is connected to a communication network such as a LAN, the Internet, or a telephone line. Specifically, the communication equipment 950 is a communication chip or a network interface card (NIC).

The positioning program is executed in the positioning system 100. The positioning program is read into the processor 910 and executed by the processor 910. The memory 921 stores not only the positioning program but also an operating system (OS). The processor 910 executes the positioning program while executing the OS. The positioning program and the OS may be stored in the auxiliary storage device 922. The positioning program and the OS that are stored in the auxiliary storage device 922 are loaded into the memory 921 and executed by the processor 910. Part or the entirety of the positioning program may be embedded in the OS.

The positioning system 100 may include a plurality of processors as an alternative to the processor 910. These processors share execution of the positioning program. Each of these processors is, like the processor 910, a device that executes the positioning program.

Data, information, signal values, and variable values that are used, processed, or output by the positioning program are stored in the memory 921 or the auxiliary storage device 922, or stored in a register or a cache memory in the processor 910.

"Unit" of each of the relative angle acquisition unit 110, the provisional position calculation unit 120, the weight calculation unit 130, and the device position calculation unit 140 may be interpreted as "process", "procedure", or "step". The positioning program causes a computer to execute a relative angle acquisition process, a provisional position calculation process, a weight calculation process, and a device position calculation process. "Process" of each of the relative angle acquisition process, the provisional position calculation process, the weight calculation process, and the device position calculation process may be interpreted as "program", "program product", "computer readable storage medium storing a program", or "computer readable recording medium recording a program". A positioning method is a method performed by execution of the positioning program by the positioning system 100. The positioning program may be stored and provided in a computer readable recording medium. Alternatively, the positioning program may be provided as a program product.

* Description of Operation *

Figure 3:
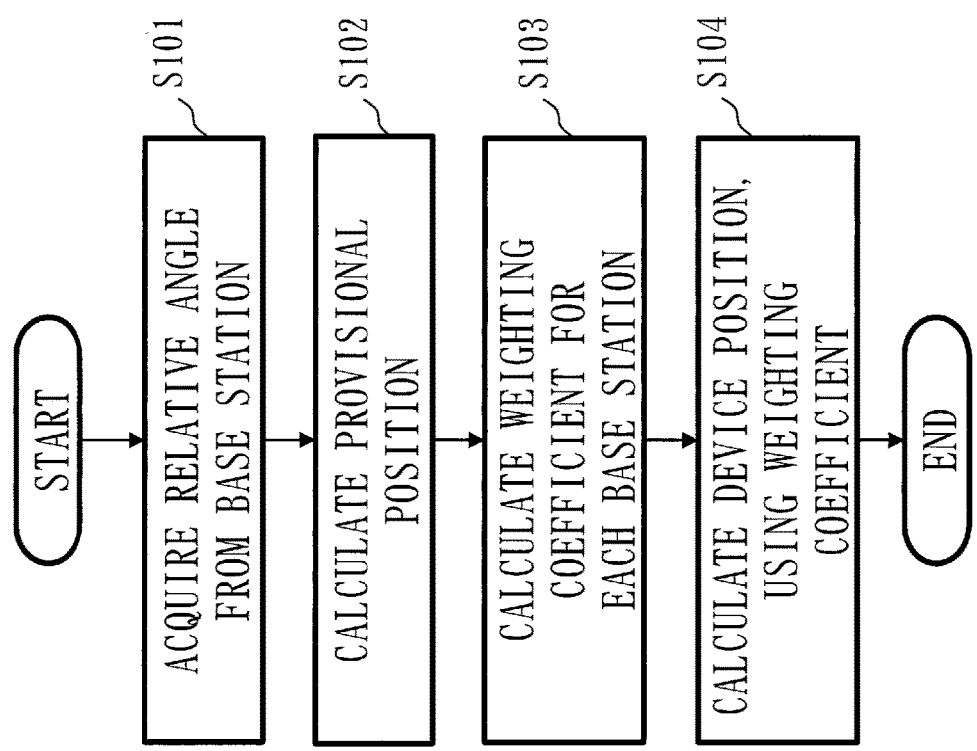
FIG. 3 is a flowchart illustrating operation of the positioning system according to Embodiment 1.

Referring to FIG. 3, operation of the positioning system 100 according to this embodiment will be described.

A procedure for the operation of the positioning system 100 is equivalent to the positioning method. A program that realizes the operation of the positioning system 100 is equivalent to the positioning program.

<Relative Angle Acquisition Process: Step S101>

The relative angle acquisition unit 110 acquires the relative angle 31 between each base station 20 of the plurality of base stations and the communication device 10 from each base station 20 of the plurality of base stations. As described in FIG. 1, the base station 20 can calculate the relative angle 31 with the communication device 10.

Figure 4:
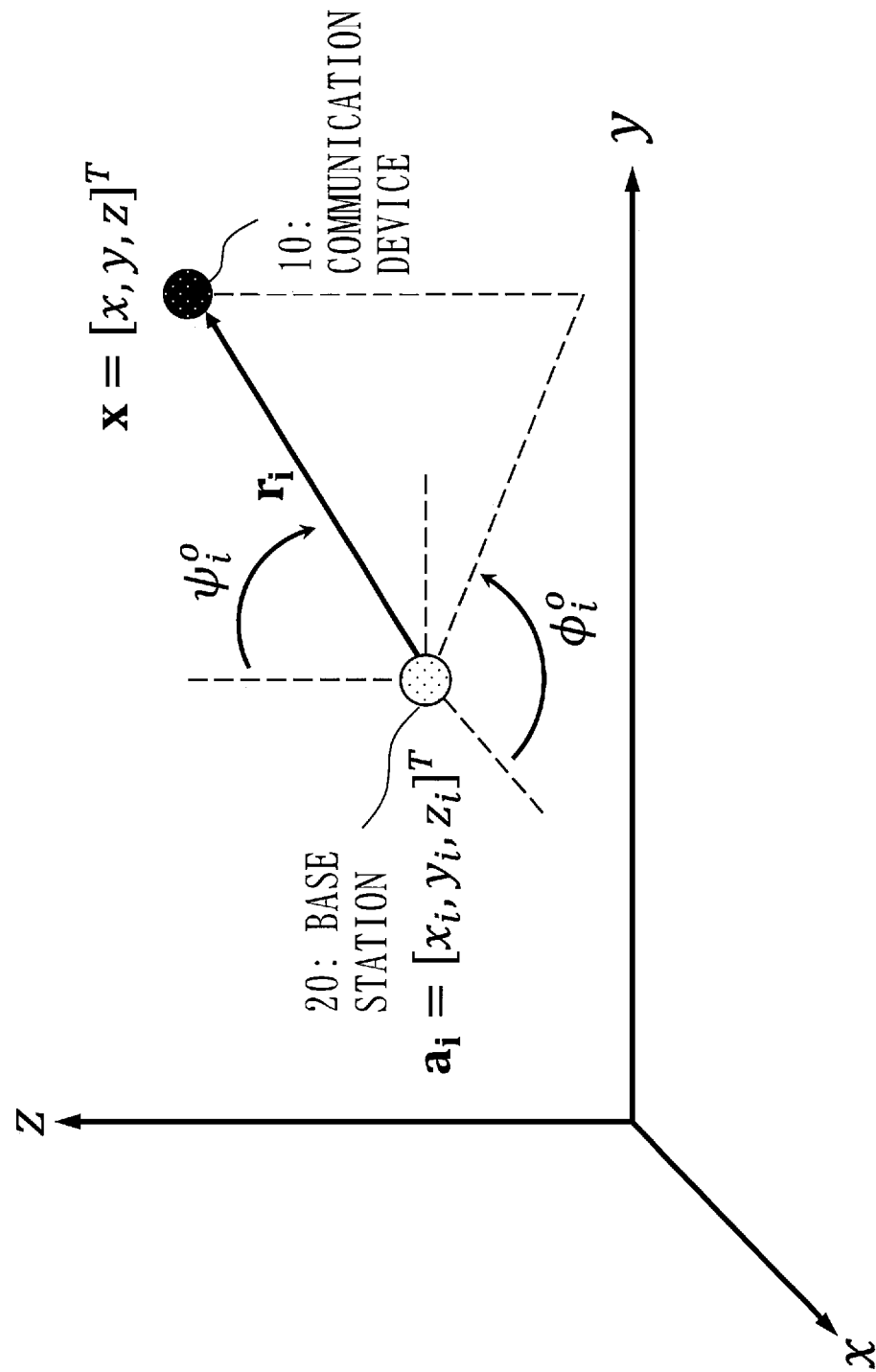
FIG. 4 is a diagram illustrating an example of an angular relationship between a base station and the communication device according to Embodiment 1.

FIG. 4 is a diagram illustrating an example of an angular relationship between the base station 20 and the communication device 10 according to this embodiment.

Figure 5:
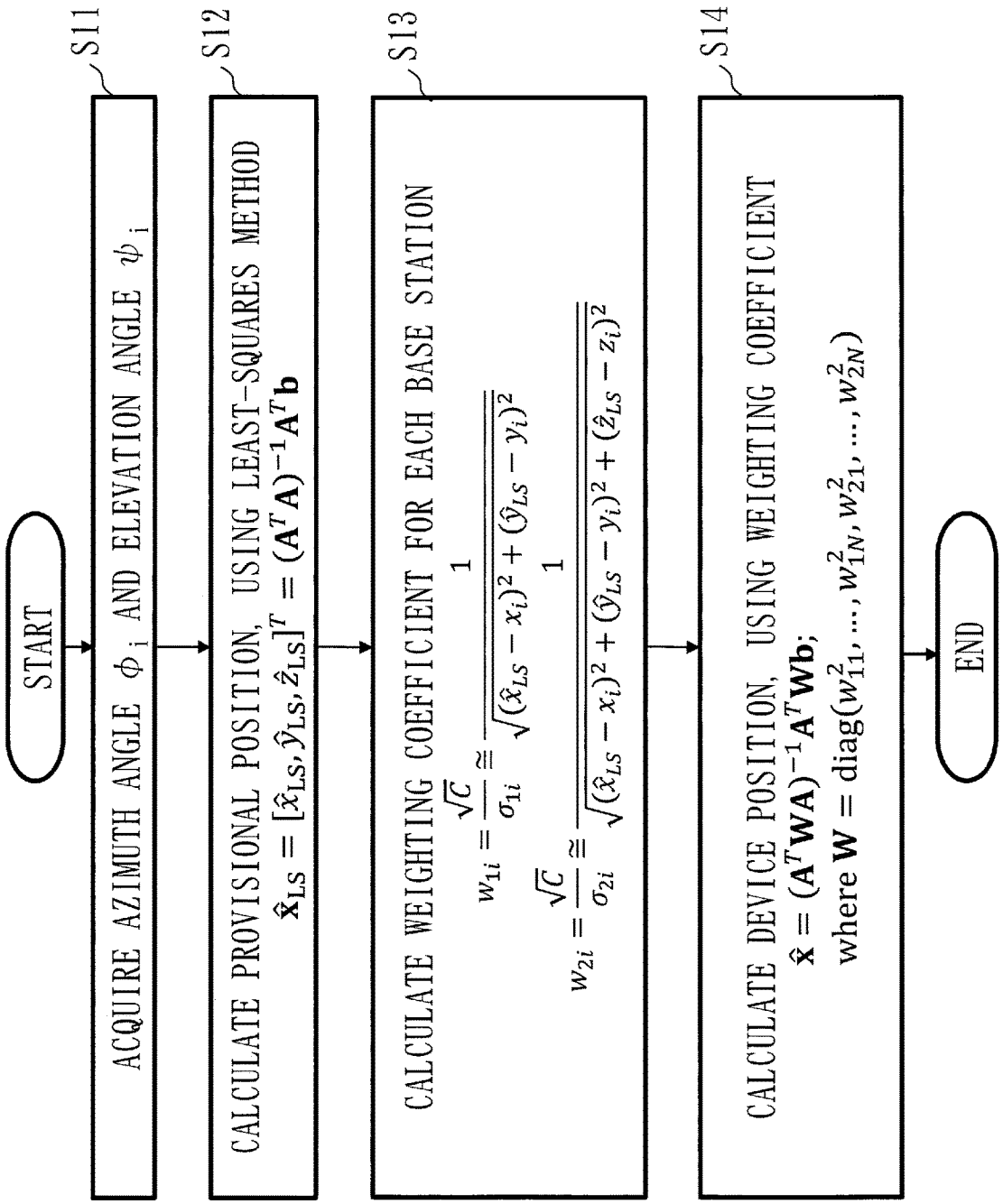
FIG. 5 is a flowchart illustrating a positioning process using three-dimensional positioning by the positioning system according to Embodiment 1.

FIG. 5 is a flowchart illustrating a positioning process using three-dimensional positioning by the positioning system 100 according to this embodiment. In FIG. 4, it is assumed that there are N base stations 20 and one communication device 10 in a three-dimensional space represented by a vector $R^3$ with three elements. The position of the base station 20 is $a_i=[x_i, y_i, z_i]^T \in R^3$, where $i=1, \ldots, N$. N is a natural number of 2 or more. The position of the communication device 10 is $x=[x, y, z]^T \in R^3$. A relative position vector $r_i$ from the communication device 10 to the position of the base station 20 is $r_i = x - a_i$.

Specifically, in step S11 of FIG. 5, the relative angle acquisition unit 110 acquires an azimuth angle $\varphi_i$ from the communication device 10 to the base station 20 and an elevation angle $\psi_i$ from the communication device 10 to the base station 20 as the relative angles 31.

Measurement noise occurs in angle measurement values. Therefore, the azimuth angle $\varphi_i$, the elevation angle $\psi_i$, and expected values of measurement noise for the angle measurement values are expressed by Formula 1 below, where $E(\cdot)$ represents an expected value of $\cdot$.

$$\varphi_i = \varphi_i^0 + \tilde{\varphi}_i$$

$$\psi_i = \psi_i^0 + \tilde{\psi}_i$$

$\tilde{\varphi}_i, \tilde{\psi}_i$: Measurement noise $$E(\tilde{\varphi}_i)=0$$

$$E(\tilde{\psi}_i)=0$$

$$E(\tilde{\varphi}_i^2)=\sigma_{\varphi_i}^2$$

$$E(\tilde{\psi}_i^2)=\sigma_{\psi_i}^2 \qquad (1)$$

<Provisional Position Calculation Process: Step S102>

The provisional position calculation unit 120 calculates the position of the communication device 10 as a provisional position 32, using the relative angle 31 between each base station 20 of the plurality of base stations and the communication device 10 and the position of each base station 20 of the plurality of base stations. The provisional position calculation unit 120 estimates the position of the communication device 10 by a least-squares method or the like, using the relative angle 31 acquired from the base station 20 and the position of the base station 20 and using geometric relationships as constraints.

Specifically, the provisional position calculation unit 120 calculates the provisional position 32 by performing the least-squares method using errors in the measurement noise of the position of the communication device 10. The errors in the measurement noise of the position of the communication device 10 are obtained based on the relative angles 31 between each base station 20 of the plurality of base stations and the communication device 10 and the position of each base station 20 of the plurality of base stations.

FIG. 6 is a diagram illustrating an example of the base station information 151 according to this embodiment.

As indicated in FIG. 6, identifiers that identify base stations and positions of the base stations are set in the base station information 151. The positions of the base stations are represented using a format such as coordinates of a three-dimensional space, coordinates of a two-dimensional space, CAD data, or BIM data. The positions of the base stations may be represented using other formats. CAD is an abbreviation for computer-aided design. BIM is an abbreviation for building information modeling. In this embodiment, it is assumed that the positions of the base stations are represented by coordinates of the three-dimensional space.

Specifically, in step S12 of FIG. 5, the provisional position calculation unit 120 performs three-dimensional positioning of the communication device 10, using the least-squares method.

A relative position vector $r_i$ from the communication device 10 to the base station 20 is $r_i = x - a_i$. Based on the relative angles between the base station 20 and the communication device 10, orthogonal vectors $c_{1i}$ and $c_{2i}$ with respect to the relative position vector $r_i$ are expressed by Formula 2 below.

$$c_{1i}=[-\sin(\varphi_i),\cos(\varphi_i),0]^T$$

$$c_{2i}=[\cos(\varphi_i)\cos(\psi_i),\sin(\varphi_i)\cos(\psi_i),-\sin(\psi_i)]^T \qquad (2)$$

By transforming the relative position vector $r_i = x - a_i$ using the orthogonal vectors $c_{1i}$ and $c_{2i}$ of Formula 2, the relational expressions of Formula 3 below are obtained, where $\varepsilon_{1i}$ and $\varepsilon_{2i}$ are errors associated with measurement noise.

$$c_{1i}^T(x-a_i)=\varepsilon_{1i}$$

$$c_{2i}^T(x-a_i)=\varepsilon_{2i} \qquad (3)$$

As described above, the errors $\varepsilon_{1i}$ and $\varepsilon_{2i}$ in the measurement noise of the position of the communication device 10 are obtained based on the relative angles 31 between each base station 20 and the communication device 10 and the position of each base station 20.

The provisional position 32, which is an estimated position of the communication device 10 obtained by the least-squares method, is represented by Formula 4 below. The provisional position 32 represented by Formula 4 is given as a solution to the minimum value problem of Formula 5 below.

$$\hat{x}_{LS}=[\hat{x}_{LS},\hat{y}_{LS},\hat{z}_{LS}]^T \qquad (4)$$

$\hat{x}_{LS}$: Provisional position 32 of the communication device 10

$$\hat{x}_{LS} = \underset{x}{\operatorname{argmin}} \sum_{i=1}^{N}\left(c_{1i}^{T}(x-a_i)\right)^2 + \sum_{i=1}^{N}\left(c_{2i}^{T}(x-a_i)\right)^2 \quad \text{[Formula 5]}$$

$\hat{x}_{LS}$: Provisional position 32 of the communication device 10

When Formula 5 is represented in a matrix format, the expression of Formula 6 below is obtained.

$R^{M \times N}$ is a matrix with M rows and N columns. Therefore, $R^{2N \times 3}$ is a matrix with 2N rows and three columns. $R^{2N \times 1}$ is a matrix with 2N rows and one column.

$$\hat{x}_{LS} = (A^T A)^{-1} A^T b; \text{ where } A = \begin{bmatrix} c_{11}^T \\ \vdots \\ c_{1N}^T \\ c_{21}^T \\ \vdots \\ c_{2N}^T \end{bmatrix} \in \mathbb{R}^{2N \times 3}, \quad \text{[Formula 6]}$$

$$b = \begin{bmatrix} c_{11}^T a_1 \\ \vdots \\ c_{11}^T a_N \\ c_{21}^T a_1 \\ \vdots \\ c_{21}^T a_N \end{bmatrix} \in \mathbb{R}^{2N \times 1}$$

$\hat{x}_{LS}$: Provisional position 32 of the communication device 10

<Weight Calculation Process: Step S103>

The weight calculation unit 130 calculates the distance between each base station 20 of the plurality of base stations and the communication device 10, using the position of each base station 20 of the plurality of base stations and the provisional position 32. Based on the distance between each base station 20 of the plurality of base stations and the communication device 10, the weight calculation unit 130 calculates a weighting coefficient 33 for correcting the provisional position 32 for each base station 20 of the plurality of base stations. The weight calculation unit 130 calculates the weighting coefficient 33 so that the greater the distance, the smaller the influence of the error in the least-squares method.

Figure 7:
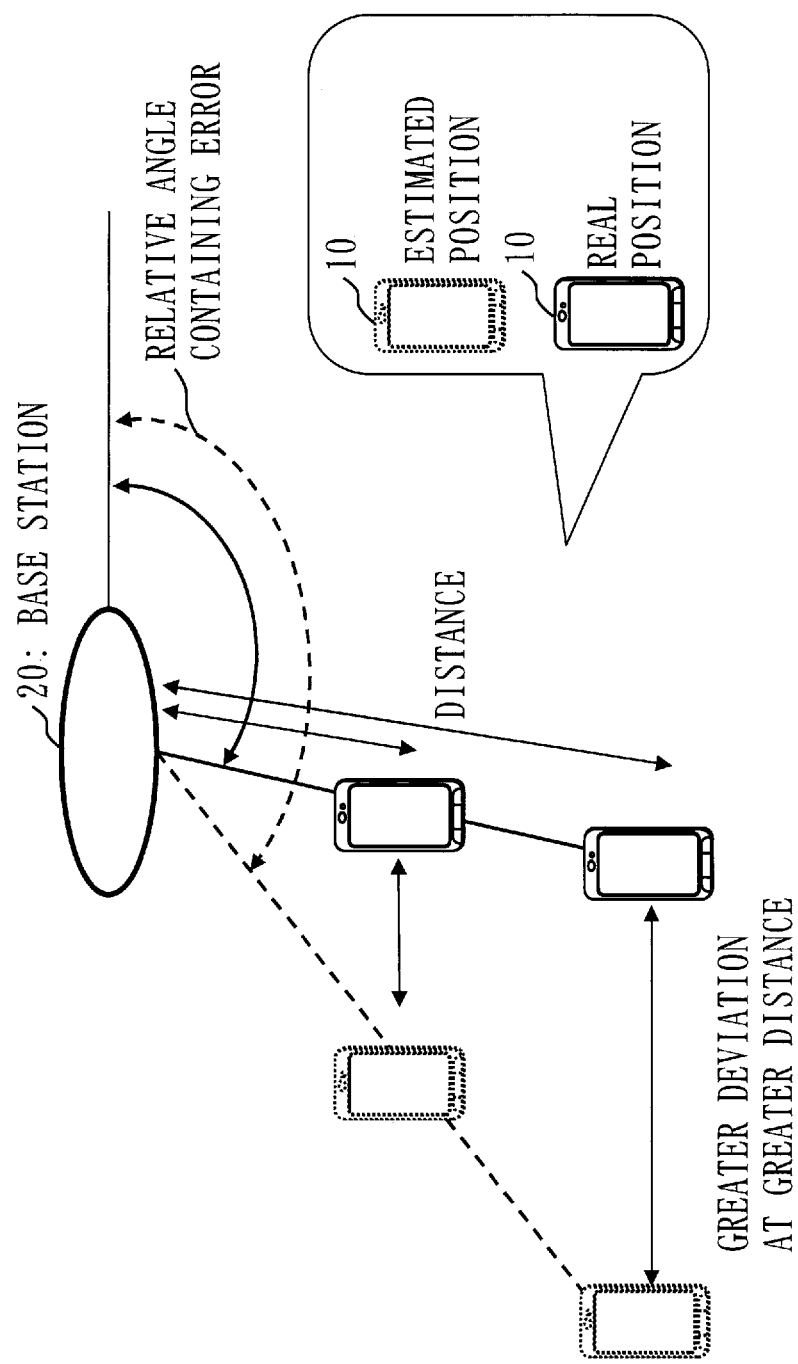
FIG. 7 is a diagram depicting a relative angle containing an error according to Embodiment 1.

FIG. 7 is a diagram depicting a relative angle containing an error according to this embodiment.

There is an error in a relative angle calculated by the base station 20. As indicated in FIG. 7, it can be seen that the greater the distance between the base station 20 and the communication device 10, the greater the deviation of the estimated position of the communication device 10 from the real position may be. Therefore, the weighting coefficient 33 is assumed to be any function that monotonically decreases with distance. Specifically, the reciprocal of the distance is used as the weighting coefficient 33.

Specifically, in step S13 of FIG. 5, the weight calculation unit 130 calculates the weighting coefficients 33 of each base station 20 as $W_{1i}$ and $W_{2i}$.

It is assumed that the measurement noise in each of the azimuth angle and the elevation angle from the communication device 10 to the base station 20 is sufficiently smaller than 1, as indicated in Formula 7 below. Using geometric relationships and the addition theorem of trigonometric functions, Formula 3 can be transformed as indicated in Formula 8 below.

$$|\tilde{\phi}_i|, |\tilde{\psi}_i| \ll 1 \quad (7)$$

$$\varepsilon_{1i} \cong -R_{2i}\tilde{\phi}_i$$

$$\varepsilon_{2i} \cong -R_{3i}\tilde{\psi}_i \quad (8)$$

$R_{2i}$ is the Euclidean distance between the base station and the communication device in an x-y plane, and is represented by Formula 9 below.

$$R_{2i} = \sqrt{(\hat{x}-x_i)^2 + (\hat{y}-y_i)^2} \quad (9)$$

$R_{3i}$ is the Euclidean distance between the base station and the communication device in a three-dimensional space and is represented by Formula 10 below.

$$R_{3i} = \sqrt{(\hat{x}-x_i)^2 + (\hat{y}-y_i)^2 + (\hat{z}-z_i)^2} \quad (10)$$

It is assumed that the measurement noise in each of the azimuth angle and the elevation angle between the communication device 10 and the base station 20 is sufficiently smaller than 1, as indicated in Formula 11 below.

$$\tilde{\phi}_i \ll 1, \tilde{\psi}_i \ll 1 \quad (11)$$

Variances $\sigma_{1i}^2$ and $\sigma_{2i}^2$ of $\varepsilon_{1i}$ and $\varepsilon_{2i}$ of Formula 8 can be calculated as indicated in Formula 12 below, where $E(\cdot)$ represents an expected value of $\cdot$.

$$\sigma_{1i}^2 = E\left((\varepsilon_{1i} - E(\varepsilon_{1i}))^2\right) \quad \text{[Formula 12]}$$
$$\cong R_{2i}^2 \sigma_{\phi_i}^2$$
$$\sigma_{2i}^2 = E\left((\varepsilon_{2i} - E(\varepsilon_{2i}))^2\right)$$
$$\cong R_{3i}^2 \sigma_{\psi_i}^2$$

Assuming that the variance of the measurement noise of the azimuth angle and the variance of the measurement noise of the elevation angle are roughly equal, the variances $\sigma_{1i}^2$ and $\sigma_{2i}^2$ can be represented using a constant C, as indicated in Formula 13 below.

$$\sigma_{1i}^2 \cong R_{2i}^2 C$$
$$\sigma_{2i}^2 \cong R_{3i}^2 C \quad (13)$$

In this embodiment, the weighting coefficients 33 are calculated using Formula 6 representing the provisional position 32 in a matrix format and a position $a_i$ of the base station 20, as indicated in Formula 14 below.

$$w_{1i} = \frac{\sqrt{C}}{\sigma_{1i}} \cong \frac{1}{\sqrt{(\hat{x}_{LS}-x_i)^2 + (\hat{y}_{LS}-y_i)^2}} \quad \text{[Formula 14]}$$

$$w_{2i} = \frac{\sqrt{C}}{\sigma_{2i}} \cong \frac{1}{\sqrt{(\hat{x}_{LS}-x_i)^2 + (\hat{y}_{LS}-y_i)^2 + (\hat{z}_{LS}-z_i)^2}}$$

Here, the weighting coefficients 33 are $W_{1i}$ and $W_{2i}$. $W_{1i}$ is a weight corresponding to the orthogonal vector $c_{1i}$ and $W_{2i}$ is a weight corresponding to the orthogonal vector $c_{2i}$. When the position of the communication device 10 is calculated, this allows weighting to be performed taking into consideration the influence of noise depending on the distance between the base station 20 and the communication device 10.

<Device Position Calculation Process: Step S104>

The device position calculation unit 140 calculates the position of the communication device 10 as a device position 34, using the relative angle 31 between each base station 20 of the plurality of base stations and the communication device 10, the position of each base station 20 of the plurality of base stations, and the weighting coefficients 33 for each base station 20 of the plurality of base stations. The device position calculation unit 140 calculates the device position 34 by performing the least-squares method by multiplying each error by the corresponding weighting coefficient 33.

Specifically, in step S14 of FIG. 5, the device position calculation unit 140 calculates the position of the communication device 10 as the device position 34 by the weighted least-squares method, using the weighting coefficients $W_{1i}$ and $W_{2i}$ of each base station 20. The weighted least-squares method is referred to also as the weighted least-squares method.

In the weighted least-squares method, the device position 34, which is the estimated position of the communication device 10, is given as a solution to the minimum value problem of Formula 15 below. This allows the influence of the base station with a great noise influence to be reduced for the device position 34, which is the estimated position of the communication device 10.

$$\hat{x} = \underset{x}{\operatorname{argmin}} \sum_{i=1}^{N} \left(w_{1i} c_{1i}^T (x - a_i)\right)^2 + \sum_{i=1}^{N} \left(w_{2i} c_{2i}^T (x - a_i)\right)^2 \quad \text{[Formula 15]}$$

$\hat{x}$: Device position 34 of the communication device 10

When Formula 15 is represented in a matrix format, Formula 16 is obtained.

$$\hat{x} = (A^T W A)^{-1} A^T W b; \quad (16)$$

where $W = \operatorname{diag}(w_{11}^2, \ldots, w_{1N}^2, w_{21}^2, \ldots, w_{2N}^2) \in \mathbb{R}^{2N \times 2N}$ $\hat{x}$: Device position 34 of the communication device 10

\*\*\* Other Configurations \*\*\*

<Variation 1>

In this embodiment, the positions of the communication device 10 and the base station 20 are represented by three-dimensional coordinates, and the position of the communication device 10 is calculated by three-dimensional positioning.

In Variation 1 according to this embodiment, the positions of the communication device 10 and the base station 20 may be represented by two-dimensional coordinates, and the position of the communication device 10 may be calculated by two-dimensional positioning. A specific example of two-dimensional positioning will be described below.

FIG. 8 is a flowchart of a positioning process using two-dimensional positioning by the positioning system 100 according to a variation of this embodiment. It is assumed here that there are N base stations 20 and one communication device 10 in a two-dimensional space represented by a vector $\mathbb{R}^2$ with two elements. The position of the base station 20 is $a_i = [x_i, y_i]^T \in \mathbb{R}^2$, where $i = 1, \ldots, N$. N is a natural number of 2 or more. The position of the communication device 10 is $x = [x, y]^T \in \mathbb{R}^2$. A relative position vector $r_i$ from the communication device 10 to the position of the base station 20 is $r_i = x - a_i$.

In step S21, the relative angle acquisition unit 110 acquires an azimuth angle $\varphi_i$ from the communication device 10 to the base station 20 from each base station 20.

In step S22, the provisional position calculation unit 120 performs two-dimensional positioning of the communication device 10, using the least-squares method.

An orthogonal vector $c_{1i}$ with respect to the relative position vector $r_i$ is represented by Formula 17 below, based on the azimuth angle $\varphi_i$.

$$c_{1i} = [-\sin(\varphi_i), \cos(\varphi_i)]^T \quad (17)$$

By transforming the relative position vector $r_i = x - a_i$ using the orthogonal vector $c_{1i}$, the relational expression of Formula 18 below is obtained, where $\varepsilon_{1i}$ is an error associated with measurement noise.

$$c_{1i}^T (x - a_i) = \varepsilon_{1i} \quad (18)$$

The provisional position 32, which is the estimated position of the communication device 10, obtained by the least-squares method is represented by Formula 19 below. The provisional position 32 represented by Formula 19 is given as a solution to the minimum value problem of Formula 20 below.

$$\hat{x}_{LS} = [\hat{x}_{LS}, \hat{y}_{LS}]^T \quad (19)$$

$\hat{x}_{LS}$: Provisional position 32 of the communication device 10

$$\hat{x}_{LS} = \underset{x}{\operatorname{argmin}} \sum_{i=1}^{N} \left(c_{1i}^T (x - a_i)\right)^2 \quad \text{[Formula 20]}$$

$\hat{x}_{LS}$: Provisional position 32 of the communication device 10

When Formula 20 is expressed in a matrix format, the expression of Formula 21 below is obtained.

$$\hat{x}_{LS} = (A^T A)^{-1} A^T b; \text{ where } A = \begin{bmatrix} c_{11}^T \\ \vdots \\ c_{1N}^T \end{bmatrix} \in \mathbb{R}^{N \times 3}, \quad \text{[Formula 21]}$$

$$b = \begin{bmatrix} c_{11}^T a_1 \\ \vdots \\ c_{11}^T a_N \end{bmatrix} \in \mathbb{R}^{N \times 1}$$

$\hat{x}_{LS}$: Provisional position 32 of the communication device 10

In step S23, the weight calculation unit 130 calculates the weighting coefficient 33 of each of the base stations 20 as $W_{1i}$, using the provisional position 32.

It is assumed that the measurement noise of the azimuth angle from the communication device 10 to the base station 20 is sufficiently smaller than 1, as indicated in Formula 7 above. Using geometric relationships and the addition theorem of trigonometric functions, Formula 18 can be transformed as indicated in Formula 22 below.

$$\varepsilon_{1i} \cong -R_{2i} \tilde{\varphi}_i \quad (22)$$

$R_{2i}$ is the Euclidean distance between the base station and the communication device in the x-y plane, and is represented as in Formula 9 above.

A variance $\sigma_{1i}^2$ of $\varepsilon_{1i}$ of Formula 22 can be calculated as indicated in Formula 23 below, where E(·) represents an expected value of ·.

$$\sigma_{1i}^2 = E\left((\varepsilon_{1i} - E(\varepsilon_{1i}))^2\right) \quad \text{[Formula 23]}$$
$$\cong R_{2i}^2 \sigma_{\phi_i}^2$$

From Formula 23, the relationship in Formula 24 below is derived.

$$\sigma_{1i}^2 \propto R_{2i}^2 \quad (24)$$

In this embodiment, the weighting coefficient 33 is calculated using Formula 21 representing the provisional position 32 and the position $a_i$ of the base station 20, as indicated in Formula 25 below.

$$w_{1i} = \frac{1}{\sqrt{(\hat{x}_{LS} - x_i)^2 + (\hat{y}_{LS} - y_i)^2}} \quad \text{[Formula 25]}$$

Here, the weighting coefficient 33 is $W_{1i}$.

In step S24, the device position calculation unit 140 calculates the device position 34 of the communication device 10 by the weighted least-squares method, using the weighting coefficient $W_{1i}$ of each base station 20.

In the weighted least-squares method, the device position 34 of the communication device 10 is treated as an estimated position, and the device position 34 of the communication device 10 is given as a solution to the minimum value problem of Formula 26 below.

$$\hat{x} = \operatorname*{argmin}_{x} \sum_{i=1}^{N} \left( w_{1i} c_{1i}^T (x - a_i) \right)^2 \quad \text{[Formula 26]}$$

$\hat{x}$: Device position 34 of the communication device 10

When Formula 26 is expressed in a matrix format, Formula 27 is obtained.

$$\hat{x} = (A^T W A)^{-1} A^T W b; \quad (27)$$

where $W = \operatorname{diag}(w_{11}^2, \ldots, w_{1N}^2) \in \mathbb{R}^{N \times N}$ $\hat{x}$: Device position 34 of the communication device 10

<Variation 2>

In this embodiment, a terminal that communicates with the base station 20 by wireless communication, such as a smartphone terminal, a tablet terminal, or a smartwatch, is assumed as a specific example of the communication device 10. However, the communication device 10 may be one base station included in a plurality of base stations.

Figure 9:
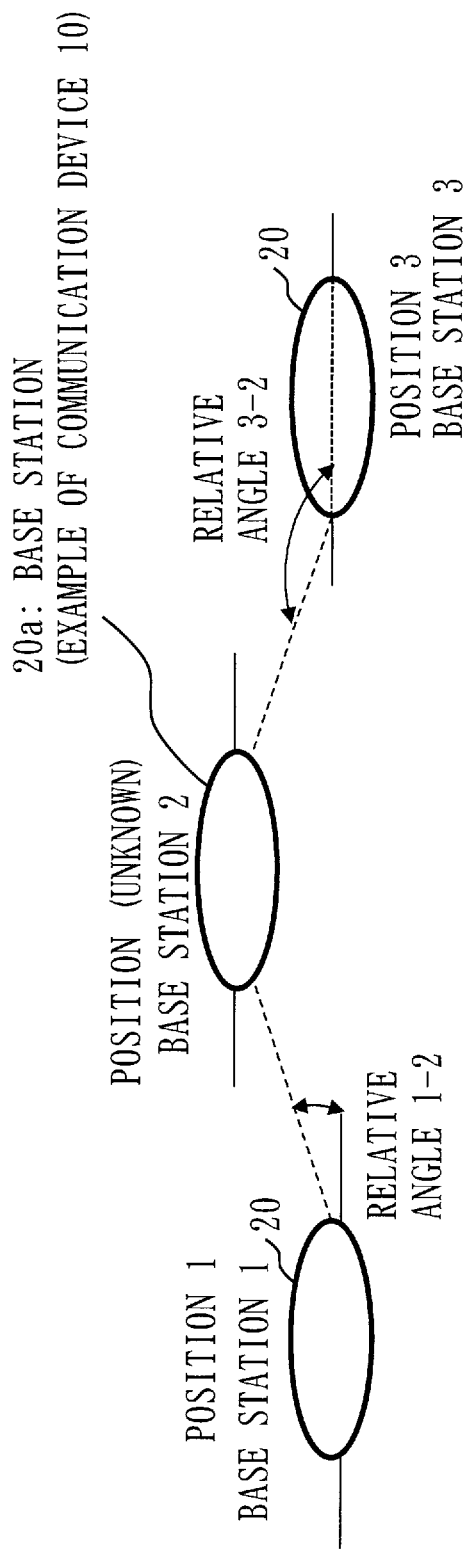
FIG. 9 is a diagram illustrating a communication device that is a positioning target and base stations according to Variation 2 of Embodiment 1.

FIG. 9 is a diagram illustrating the communication device 10 that is a positioning target and the base stations 20 according to Variation 2 of this embodiment. A base station 20a of the plurality of base stations is an example of the communication device 10 that is the positioning target. The base station 20a wirelessly communicates with other base stations of the plurality of base stations.

As described above, a base station may be regarded as the positioning target. As indicated in FIG. 9, the position of the base station 20a whose position is unknown may be calculated based on the position of each base station 20 of the plurality of base stations and the relative angle between each base station 20 and the base station 20a.

<Variation 3>

In this embodiment, the functions of the relative angle acquisition unit 110, the provisional position calculation unit 120, the weight calculation unit 130, and the device position calculation unit 140 are realized by software. As a variation, the functions of the relative angle acquisition unit 110, the provisional position calculation unit 120, the weight calculation unit 130, and the device position calculation unit 140 may be realized by hardware.

Specifically, the positioning system 100 includes an electronic circuit 909 in place of the processor 910.

Figure 10:
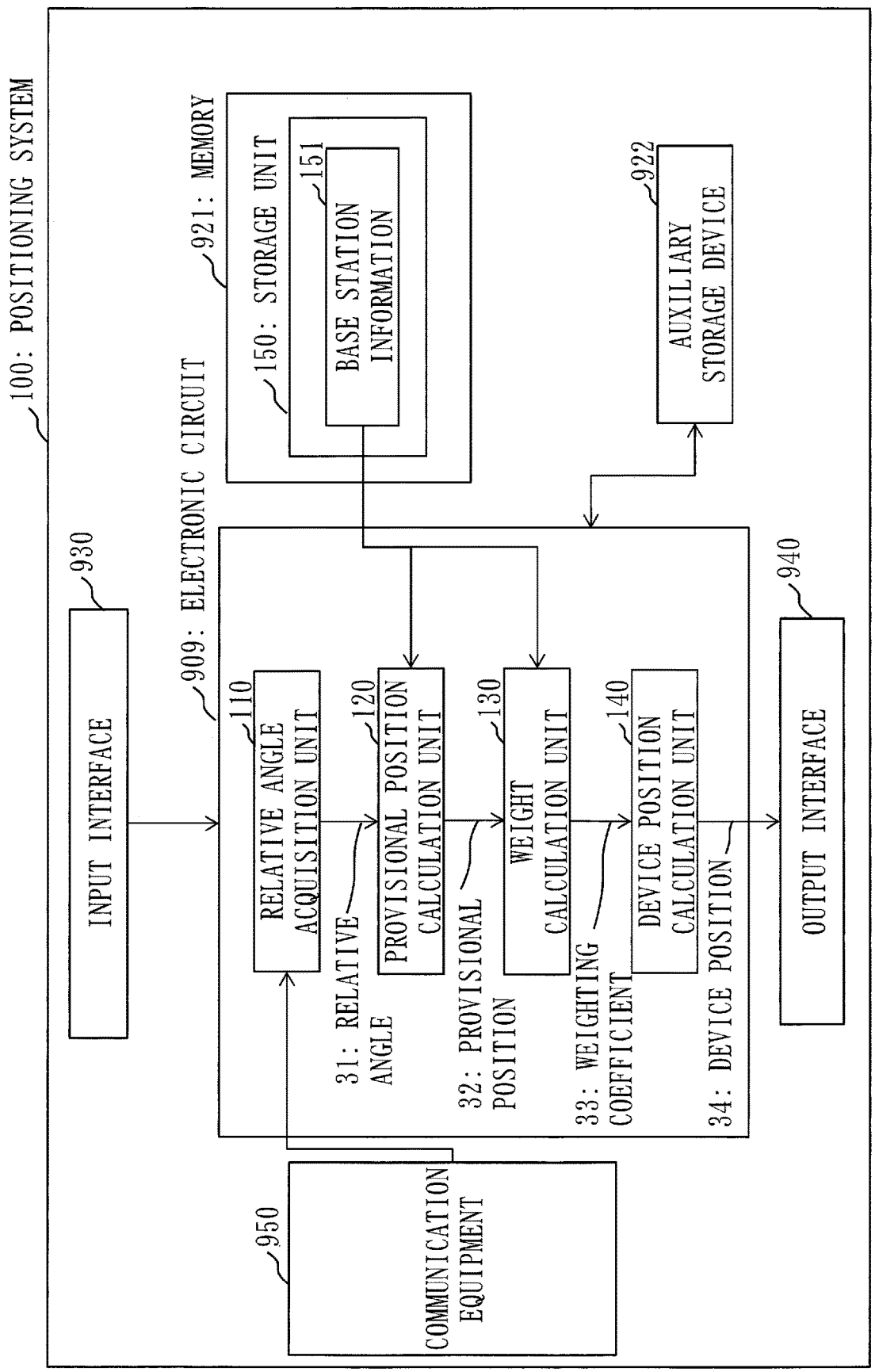
FIG. 10 is an example of a configuration of the positioning system according to Variation 3 of Embodiment 1.

FIG. 10 is a diagram illustrating a configuration of the positioning system 100 according to Variation 3 of this embodiment.

The electronic circuit 909 is a dedicated electronic circuit that realizes the functions of the relative angle acquisition unit 110, the provisional position calculation unit 120, the weight calculation unit 130, and the device position calculation unit 140. Specifically, the electronic circuit 909 is a single circuit, a composite circuit, a programmed processor, a parallel-programmed processor, a logic IC, a GA, an ASIC, or an FPGA. GA is an abbreviation for Gate Array. ASIC is an abbreviation for Application Specific Integrated Circuit. FPGA is an abbreviation for Field-Programmable Gate Array.

The functions of the relative angle acquisition unit 110, the provisional position calculation unit 120, the weight calculation unit 130, and the device position calculation unit 140 may be realized by one electronic circuit, or may be distributed among and realized by a plurality of electronic circuits.

As another variation, some of the functions of the relative angle acquisition unit 110, the provisional position calculation unit 120, the weight calculation unit 130, and the device position calculation unit 140 may be realized by the electronic circuit, and the rest of the functions may be realized by software. Alternatively, some or all of the functions of the relative angle acquisition unit 110, the provisional position calculation unit 120, the weight calculation unit 130, and the device position calculation unit 140 may be realized by firmware.

Each of the processor and the electronic circuit is also called processing circuitry. That is, the functions of the relative angle acquisition unit 110, the provisional position calculation unit 120, the weight calculation unit 130, and the device position calculation unit 140 are realized by the processing circuitry.

EFFECTS OF THIS EMBODIMENT

As described above, the positioning system 100 according to this embodiment first calculates the provisional position of the communication device by the least-squares method or the like, using the relative angle acquired from each base station and the position of each base station and using geometric relationships as constraints. Then, the positioning system 100 calculates the distance between the communication device and each base station, based on the provisional position of the communication device and the position of each base station. Then, the positioning system 100 estimates the final position of the communication device as the device position by the weighted least-squares method or the like, using geometric relationships as constraints and using a weight based on the distance.

As described above, the positioning system 100 according to this embodiment can realize highly accurate positioning using only angle information by performing weighting such that the influence of a distant base station is reduced.

In Embodiment 1 above, each unit of the positioning system has been described as an independent functional block. However, the configuration of the positioning system may be different from the configuration in the above embodiment. The functional blocks of the positioning system may be configured in any way, provided that the functions described in the above embodiment can be realized. The positioning system may be a system composed of a plurality of devices instead of one device.

Portions of Embodiment 1 may be implemented in combination. Alternatively, one portion of this embodiment may be implemented. This embodiment may be implemented as a whole or partially in any other combination.

That is, in Embodiment 1, portions of the embodiment may be freely combined, any constituent element of the embodiment may be modified, or any constituent element may be omitted in the embodiment.

The embodiment described above is an essentially preferable example and is not intended to limit the scope of the present disclosure, the scope of applications of the present disclosure, and the scope of uses of the present disclosure. The embodiment described above can be modified in various ways as necessary.

REFERENCE SIGNS LIST

10: communication device; 20, 20a: base station; 31: relative angle; 32: provisional position; 33: weighting coefficient; 34: device position; 100: positioning system; 110: relative angle acquisition unit; 120: provisional position calculation unit; 130: weight calculation unit; 140: device position calculation unit; 150: storage unit; 151: base station information; 909: electronic circuit; 910: processor; 921: memory; 922: auxiliary storage device; 930: input interface; 940: output interface; 950: communication equipment.

The invention claimed is:

1. A positioning system to perform positioning of a communication device that wirelessly communicates with each base station of a plurality of base stations, the positioning system comprising
processing circuitry to:
acquire a relative angle between each base station of the plurality of base stations and the communication device from each base station of the plurality of base stations;
calculate a first position of the communication device as a provisional position, using the relative angle between each base station of the plurality of base stations and the communication device and a position of each base station of the plurality of base stations;
calculate a distance between each base station of the plurality of base stations and the communication device, using the position of each base station of the plurality of base stations and the provisional position, and calculate a weighting coefficient for correcting the provisional position for each base station of the plurality of base stations, based on the distance between each base station of the plurality of base stations and the communication device, wherein the weighting coefficient is a function that monotonically decreases with the distance between each base station of the plurality of base stations and the communication device;
calculate a second position of the communication device as a device position, using the relative angle between each base station of the plurality of base stations and the communication device, the position of each base station of the plurality of base stations, and the weighting coefficient for each base station of the plurality of base stations; and
output the calculated device position of the communication device for use as an accurate position of the communication device based only on information associated with the relative angle between each base station of the plurality of base stations and the communication device.

2. The positioning system according to claim 1,
wherein the processing circuitry calculates the provisional position by performing a least-squares method using an error in measurement noise of the first position of the communication device, the error being obtained based on the relative angle between each base station of the plurality of base stations and the communication device and the position of each base station of the plurality of base stations, and
calculates the device position by performing the least-squares method by multiplying the error by the weighting coefficient.

3. The positioning system according to claim 2,
wherein the processing circuitry calculates the weighting coefficient that makes influence of the error in the least-squares method smaller as the distance is greater.

4. The positioning system according to claim 3,
wherein the communication device is one base station included in the plurality of base stations, and
wherein the one base station wirelessly communicates with another base station of the plurality of base stations.

5. The positioning system according to claim 2,
wherein the communication device is one base station included in the plurality of base stations, and
wherein the one base station wirelessly communicates with another base station of the plurality of base stations.

6. The positioning system according to claim 1,
wherein the communication device is one base station included in the plurality of base stations, and
wherein the one base station wirelessly communicates with another base station of the plurality of base stations.

7. A positioning method of a positioning system to perform positioning of a communication device that wirelessly communicates with each base station of a plurality of base stations, the positioning method comprising:
acquiring a relative angle between each base station of the plurality of base stations and the communication device from each base station of the plurality of base stations;
calculating a first position of the communication device as a provisional position, using the relative angle between each base station of the plurality of base stations and the communication device and a position of each base station of the plurality of base stations;
calculating a distance between each base station of the plurality of base stations and the communication device, using the position of each base station of the plurality of base stations and the provisional position, and calculating a weighting coefficient for correcting the provisional position for each base station of the plurality of base stations, based on the distance between each base station of the plurality of base stations and the communication device, wherein the weighting coefficient is a function that monotonically decreases with the distance between each base station of the plurality of base stations and the communication device;

calculating a second position of the communication device as a device position, using the relative angle between each base station of the plurality of base stations and the communication device, the position of each base station of the plurality of base stations, and the weighting coefficient for each base station of the plurality of base stations; and outputting the calculated device position of the communication device for use as an accurate position of the communication device based only on information associated with the relative angle between each base station of the plurality of base stations and the communication device.

8. A non-transitory computer readable medium storing a positioning program of a positioning system to perform positioning of a communication device that wirelessly communicates with each base station of a plurality of base stations, the positioning program causing a computer to execute:

a relative angle acquisition process of acquiring a relative angle between each base station of the plurality of base stations and the communication device from each base station of the plurality of base stations;

a provisional position calculation process of calculating a first position of the communication device as a provisional position, using the relative angle between each base station of the plurality of base stations and the communication device and a position of each base station of the plurality of base stations;

a weight calculation process of calculating a distance between each base station of the plurality of base stations and the communication device, using the position of each base station of the plurality of base stations and the provisional position, and calculating a weighting coefficient for correcting the provisional position for each base station of the plurality of base stations, based on the distance between each base station of the plurality of base stations and the communication device, wherein the weighting coefficient is a function that monotonically decreases with the distance between each base station of the plurality of base stations and the communication device;

a device position calculation process of calculating a second position of the communication device as a device position, using the relative angle between each base station of the plurality of base stations and the communication device, the position of each base station of the plurality of base stations, and the weighting coefficient for each base station of the plurality of base stations; and a device position output process of outputting the calculated device position of the communication device for use as an accurate position of the communication device based only on information associated with the relative angle between each base station of the plurality of base stations and the communication device.

* * * * *